United States Patent
Han et al.

(10) Patent No.: US 7,830,214 B2
(45) Date of Patent: Nov. 9, 2010

(54) ADJUSTABLE CHAOTIC SIGNAL GENERATOR USING PULSE MODULATION FOR ULTRA WIDEBAND (UWB) COMMUNICATIONS AND CHAOTIC SIGNAL GENERATING METHOD THEREOF

(75) Inventors: Sang-min Han, Hwaseong-si (KR); Popov Oleg, Suwon-si (KR); Seong-soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1027 days.

(21) Appl. No.: 11/600,864

(22) Filed: Nov. 17, 2006

(65) Prior Publication Data
US 2007/0121945 A1 May 31, 2007

(30) Foreign Application Priority Data
Nov. 29, 2005 (RU) .............................. 2005137052
Aug. 10, 2006 (KR) ...................... 10-2006-0075759

(51) Int. Cl.
*H03B 29/00* (2006.01)
(52) U.S. Cl. .................. 331/78; 332/117; 327/131; 327/291; 327/355; 327/361
(58) Field of Classification Search ................. 331/78; 332/117; 327/131, 291, 355, 361
See application file for complete search history.

(56) References Cited

U.S. PATENT DOCUMENTS 7,642,870 B2 * 1/2010 Han et al. ...................... 331/78

OTHER PUBLICATIONS

Woo-Kyung, Lee et al.: "Implementation of a multi-signal generator for Ultra Wideband tranceiver", Ultra Wideband Systems, 2004. Joint with Conference on Ultrawideband Systems and Technologies. Joint UWBST & IWUWBS. 2004 International Workshop on May 18-21, 2004, pp. 263-267.
Chia-Chin Chong et al.: "LR-WPAN system design based on UWB direct chaotic communication technology", Vehicular Technology Conference, 2005., VTC-2005-Fall. 2005 IEEE 62nd vol. 1, Sep. 25-28, pp. 63-67.

* cited by examiner

*Primary Examiner*—Arnold Kinkead
(74) *Attorney, Agent, or Firm*—Sughrue Mion, PLLC

(57) ABSTRACT

An adjustable chaotic signal generator using pulse modulation for UWB communications, and a chaotic signal generating method thereof are provided. The chaotic signal generator for UWB communications includes a plurality of pulse generators which generates pulses of different frequencies; at least one combiner which combines the pulses generated at the pulse generators; and a plurality of local oscillators which receives signals from the combiner, respectively, and generates a chaotic signal by increasing the received signals to different frequency bands. Accordingly, a plurality of users can conduct the radio communications in a specific wireless communication range at the same time by generating the chaotic signal that can be split to the multiple channels. Also, the chaotic signal generator is structured using devices integratable on an integrated circuit.

17 Claims, 5 Drawing Sheets

ADJUSTABLE CHAOTIC SIGNAL GENERATOR USING PULSE MODULATION FOR ULTRA WIDEBAND (UWB) COMMUNICATIONS AND CHAOTIC SIGNAL GENERATING METHOD THEREOF

CROSS-REFERENCE TO RELATED APPLICATIONS

This application claims priority under Korean Patent Application No. 10-2006-0075759, filed Aug. 10, 2006, in the Korean Intellectual Property Office, and Russian Patent Application 2005137052, filed Nov. 29, 2005, in the Russian Patent Office, the entire contents of which are incorporated herein by reference.

BACKGROUND OF THE INVENTION

1. Field of the Invention

Apparatuses and methods consistent with the present invention generally relate to an adjustable chaotic signal generator using pulse modulation for ultra wideband (UWB) communications and a chaotic signal generating method thereof. More particularly, apparatuses and methods consistent with the present invention relate to an adjustable chaotic signal generator using pulse modulation for UWB communications, which enables a plurality of users to wirelessly communicate at the same time within a specific wireless communication range by generating a chaotic signal that can be split to a plurality of channels.

2. Description of the Related Art

In addition to Bluetooth, wireless communication schemes using the ultra wideband (UWB) frequency band of 3.1~5.1 GHz are under development, one of which utilizes a chaotic signal in accordance with IEEE 802.15.4a Standard.

IEEE 802.15.4a, which is a "location-recognition low-power sensor network standardization group", is a next generation communication technology having a location recognition function and a low power consumption based on a combination of 802.15.4 (ZigBee) and 802.15.3 (UWB).

A chaotic signal modulation has been suggested to realize low power consumption. The chaotic signal modulation can be designed in a simplified radio frequency (RF) hardware structure and does not need circuits such as a voltage-controlled oscillators (VCO), a phase-locked loop (PLL) circuit, a mixer and so forth, that have been required for a conventional wireless communication system. Accordingly, the use of chaotic signal modulation can reduce power consumption to 10 mW which is merely one third of conventional power consumption.

An aspect of chaotic signal modulation is a chaotic signal generator which generates an UWB chaotic signal. A conventional chaotic signal generator generates a chaotic signal in the UWB of 3.1~5.1 GHz. The generated chaotic signal is modulated to a chaotic carrier using ON and OFF according to on-off keying (OOK).

However, the chaotic signal, which is generated at the chaotic signal generator, is shaped into a single signal having the entire UWB frequency band. Thus, when a plurality of users uses wireless devices within a specific wireless communication range, interference occurs because the same channel is being used. As a result, only one wireless device can transmit and receive radio signals in the specific wireless communication range at a time. That is, frequency division multiplexing (FDM), which enables users to communicate in a certain wireless communication range using multiple frequency channels, is infeasible.

Therefore, what is needed is a method for enabling a plurality of users to wirelessly communicate in a specific wireless communication range at the same time in accordance with FDM by splitting the chaotic signal generated at the chaotic signal generator into multiple frequency bands, that is, into multiple channels.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides an adjustable chaotic signal generator using pulse modulation for UWB communications, which enables a plurality of users to carry out radio communications in a specific wireless communication range at the same time by generating radio signals that can be split to multiple frequency bands, and a chaotic signal generating method thereof.

Another aspect of the present invention is to provide an adjustable chaotic signal generator using pulse modulation for UWB communications, which is structured using devices integratable on an integrated circuit (IC), and a chaotic signal generating method thereof.

According to an aspect of the present invention, a chaotic signal generator for ultra wideband (UWB) communications includes a plurality of pulse generators which generates pulses of different frequencies; at least one combiner which combines the pulses generated at the pulse generators; and a plurality of local oscillators which receives signals from the combiner, respectively, and generates a chaotic signal by increasing the received signals to different frequency bands.

Frequencies of the pulses generated at the pulse generators may be determined such that the pulses from the pulse generators are arranged at random after passing through the combiner.

The combiner may be an OR gate.

The combiner may be provided with respect to each of the local oscillators.

The chaotic signal generator may further include a power divider which divides the signal combined at the combiner to the local oscillators. Only one combiner may be arranged.

The number of the local oscillators may be determined according to a frequency bandwidth of the chaotic signals output from the local oscillators.

The number of the local oscillators may be determined according to a frequency bandwidth of channels. The number of the local oscillators may be determined according to the number of channels.

The local oscillator may be a voltage controlled oscillator (VCO).

The chaotic signal generator may further include a power combiner which generates an UWB chaotic signal by combining the signals generated at the local oscillators.

The chaotic signal generator may further include a filter which filters and outputs only a chaotic signal of a preset frequency band from the chaotic signal output from the power combiner.

The filter may be a tunable band pass filter (BPF) which changes a filtered frequency band.

According to another aspect of the present invention, a chaotic signal generator for UWB communications includes a plurality of pulse generators which generates pulses having different frequencies; at last one combiner which combines the pulses generated at the pulse generators; a plurality of local oscillators which receives signals from the combiner, respectively, and increases the received signals to different frequency bands; a power combiner which generates an UWB chaotic signal by combining the signals generated at the local oscillators; and a filter which filters and outputs only a chaotic signal of a preset frequency band from the chaotic signal output from the power combiner.

According to another aspect of the present invention, a chaotic signal generating method for UWB communications includes generating a plurality of pulses of different frequencies; combining the generated pulses; increasing the combined signal to different frequency bands, respectively; and generating an UWB chaotic signal by combining the signals increased to the different frequency bands.

BRIEF DESCRIPTION OF THE DRAWINGS

The above aspects of the present invention will become more apparent by describing in detail exemplary embodiments thereof with reference to the attached drawing figures, in which.

DETAILED DESCRIPTION OF THE EXEMPLARY EMBODIMENTS

Figure 1:
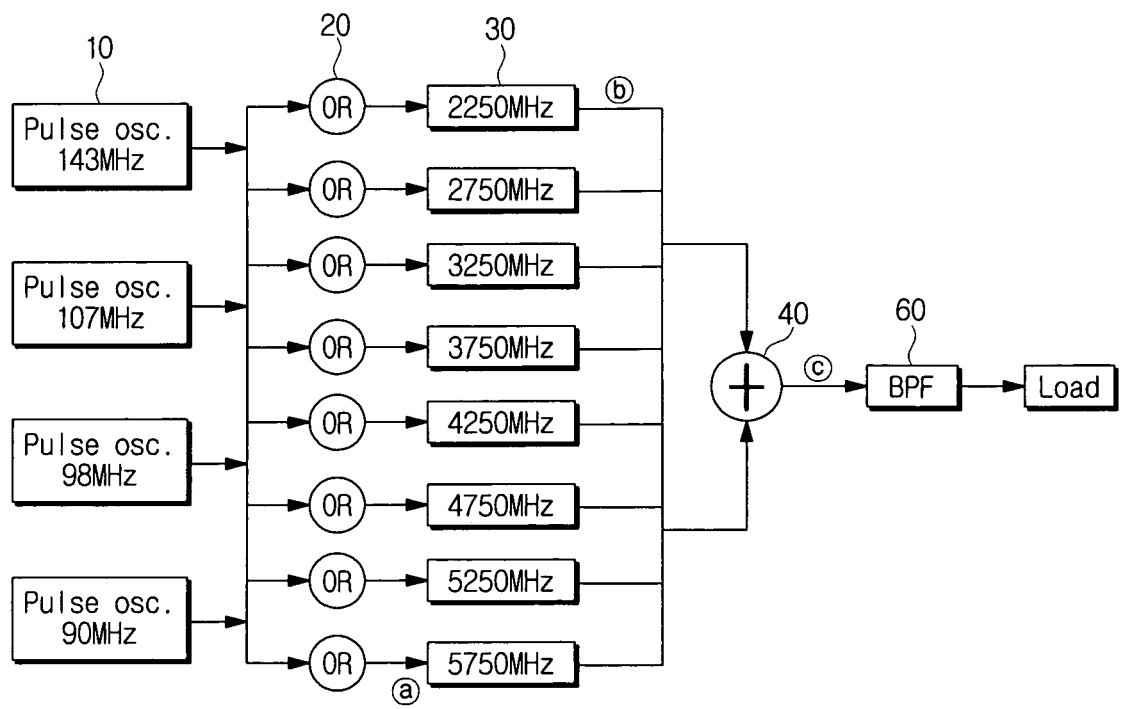
FIG. 1 is a block diagram of a chaotic signal for UWB communications according to one exemplary embodiment of the present invention.

Certain exemplary embodiments of the present invention will be described in greater detail with reference to the accompanying drawings.

In the following description, the same drawing reference numerals are used to designate analogous elements throughout the drawings. The matters defined in the description such as a detailed construction and elements are provided to assist in a comprehensive understanding of the invention. However, the present invention can be carried out in different manners. Also, well-known functions or constructions are not described in detail since they would obscure the invention in unnecessary detail.

FIG. 1 is a block diagram of a chaotic signal generator for UWB communications according to one exemplary embodiment of the present invention.

The chaotic signal generator for UWB communications generates a chaotic signal or a noise signal. The chaotic signal generator includes a plurality of pulse generators 10, a plurality of OR gates 20, a plurality of local oscillators 30, a power combiner 40, a band pass filter (BPF) 60, and a load.

The plurality of pulse generators 10 generates pulses at different intervals. The each of the plurality of pulse generators 10 operates independently from each other. As the pulse generation intervals differ at the plurality of pulse generators 10, pulse frequencies generated at the plurality of pulse generators 10 also differ from each other. The plurality of pulse generators 10 determines the pulse spectral width.

In the exemplary embodiment as shown in FIG. 1, the plurality of pulse generators 10 includes four pulse generators to generate pulses having frequencies of 143 MHz, 107 MHz, 98 MHz, and 90 MHz, respectively.

Figure 2:
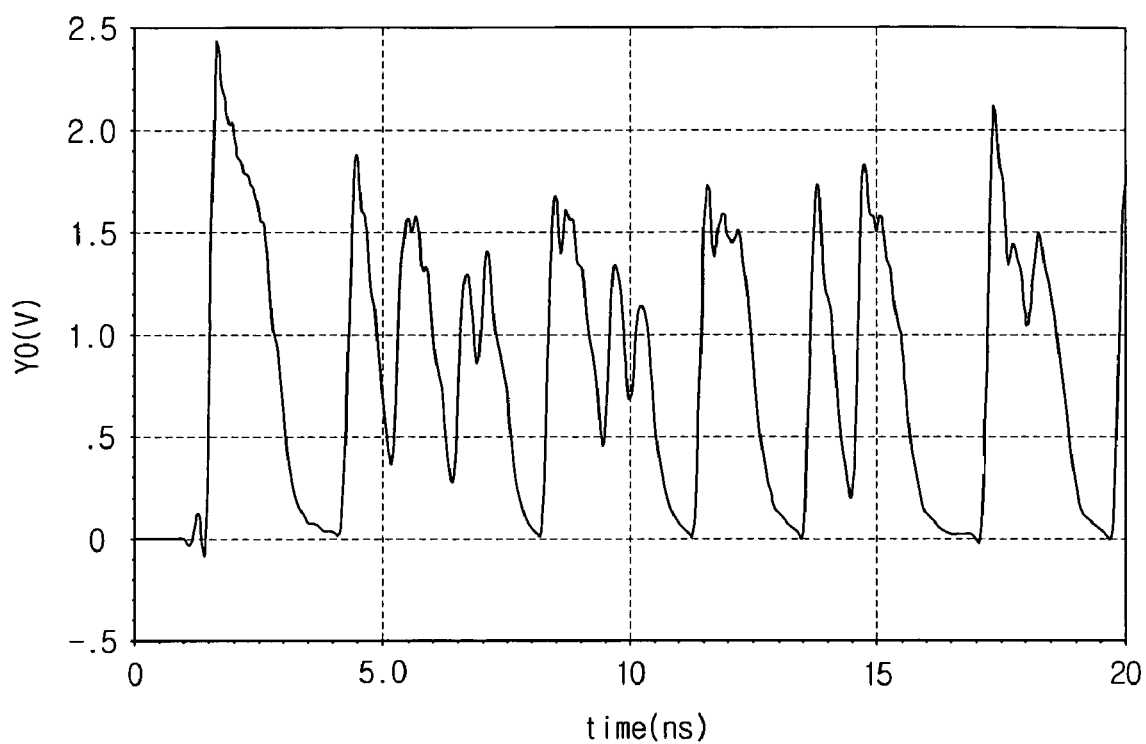
FIG. 2 is a waveform diagram of a signal extracted at the point (a) which is the output point of the OR gate of FIG. 1.

The number of the pulse generators included in the plurality of pulse generators 10 and the frequencies of the pulses output from the plurality of pulse generators 10 are determined such that the pulse signal in which the pulses are randomly laid out is output from the plurality of OR gates 20 as shown in FIG. 2. It is noted that the number of the pulse generators included A in the plurality of pulse generators 10 and the frequencies of the plurality of pulse generators 10 can vary according to design.

The each of the plurality of OR gates 20 outputs a pulse signal by combining the pulses generated at the plurality of pulse generators 10. The pulse signal produced from each of the plurality of OR gates 20 is shaped as a binary signal, in which the pulses output from the plurality of pulse generators 10 are laid out at random as shown in FIG. 2. Each pulse of the pulse signal changes its width and magnitude by noise, and the upper portion of the pulse is in an irregular form. The pulse signals are uniformly output from the plurality of OR gates 20. The number of the OR gates in the plurality of OR gates 20 equals the number of the plurality of local oscillators 30.

The plurality of the local oscillators 30 oscillates different frequencies and increases the frequencies of the pulse signals provided from the OR gates 20 to their oscillation frequency bands. Since the same pulse signals are output from each of the plurality of OR gates 20, the same pulse signals are input to each of the plurality of local oscillators 30 while the signals output from each of the plurality of local oscillators 30 have different frequency bands.

The plurality of OR gates 20 controls the signal received at the plurality of local oscillators 30 by behaving in ON and OFF after the OOK. In detail, as each of the plurality of OR gates 20 is turned on and off, the pulse signal from each of the plurality of OR gates 20 is sequentially input to the corresponding one of the plurality of local oscillators 30. As a result, the amplitude modulation effect is acquired so that the chaotic signal is output from each of the plurality of local oscillators 30. The chaotic signals are combined together at the power combiner 40 to thus produce an UWB chaotic signal having a wide bandwidth.

In FIG. 1, eight local oscillators included in the plurality of local oscillators 30 are arranged at the oscillation frequency intervals of 500 MHz ranging 2250-5750 MHz. Thus, eight chaotic signals having different center frequencies are produced from the plurality of local oscillators 30.

Figure 3:
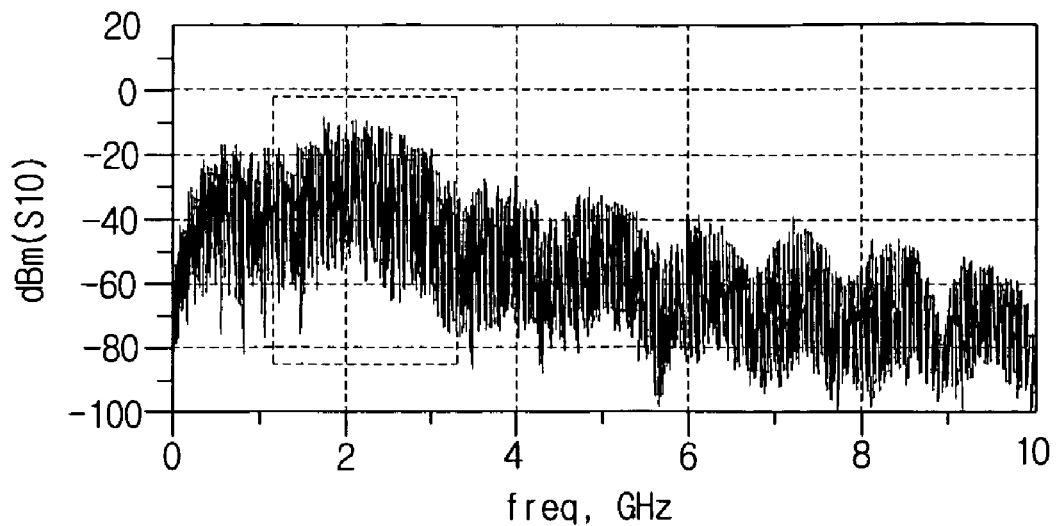
FIG. 3 is a waveform diagram of a signal extracted at the point (b) which is the output point of the local oscillator generating an oscillation frequency of 2250 MHz of the local oscillators in FIG. 1.

FIG. 3 depicts the signal output from one local oscillator of the plurality of local oscillators 30 of FIG. 1. The local oscillator generates the oscillation frequency of 2250 MHz. As shown in FIG. 3, the local oscillator receives the pulse signal from one of the plurality of OR gates 20 and outputs the noise-like chaotic signal. In the section of the signal inside the dotted line drawn in FIG. 3, the center frequency is 2250 MHz and the output is higher than other frequencies in the corresponding frequency range having the bandwidth of about 2.3 GHz. That is, as one can see, the chaotic signal generation is concentrated at 2250 MHz which is the oscillation frequency band of the local oscillator. Likewise, the chaotic signals output from the other local oscillators of the plurality of local oscillators 30 show higher output in the corresponding oscillation frequency bands.

Meanwhile, the number of the local oscillators of the plurality of local oscillators 30 may be determined according to the bandwidth of the chaotic signal finally produced, the frequency bandwidth in one channel, and the number of channels. In one exemplary embodiment of the present invention, eight local oscillators are used in the range of 2250-5750 MHz and the interval between the frequencies oscillated by the local oscillators is set to 500 MHz. Hence, the chaotic signal is generated throughout the frequency band of 2250-5750 MHz, eight channels are established, and the channel bandwidth is 500 MHz. However, if the chaotic signal of 3000-4000 MHz is to be produced, the local oscillators having the oscillation frequencies of 3200 MHz, 3400 MHz, 3600 MHz, and 3800 MHz can be employed. In this case, four channels are formed and the frequency bandwidth of the channel is 200 MHz.

The local oscillator 30 can be implemented using a voltage controlled oscillator (VCO). Since the VCO can control the oscillation frequency by the applied voltage, a plurality of frequencies can be produced using a single VCO. Thus, the local oscillators can be implemented with a smaller number of VCOs than the number of local oscillators 30 in FIG. 1.

Figure 4:
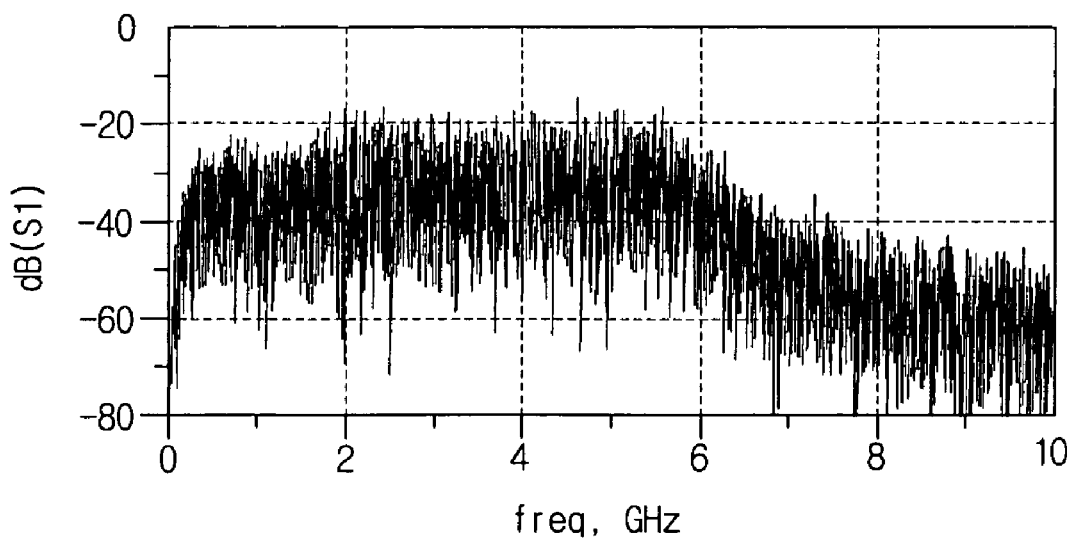
FIG. 4 is a waveform diagram of a signal extracted at the point (c) which is the output point of the power combiner of FIG. 1.

The power combiner 40 combines the chaotic signals output from the plurality of local oscillators 30 and produces the UWB chaotic signal. Therefore, the chaotic signal ranging 1.5-6 GHz is generated as shown in FIG. 4.

The BPF 60 is disposed at the output stage of the power combiner 40. The BPF 60 is a tunable BPF that can change the filtered band. The BPF 60 changes the filtered band so as to output the chaotic signal of the frequency band corresponding to the selected channel. FIGS. 6A through 6D show the frequency shift of the chaotic signal which is output from the BPF 60 when the filtered band of the BPF 60 is changed.

The chaotic signal produced from the chaotic signal generator ranges throughout the frequency band corresponding to the UWB band by combining the output signals of the plurality of the local oscillators 30. Accordingly, when a specific frequency bandwidth is set to the channel and filtered according to the channel using the filter, it is possible to output only the frequency corresponding to the channel.

Figure 5:
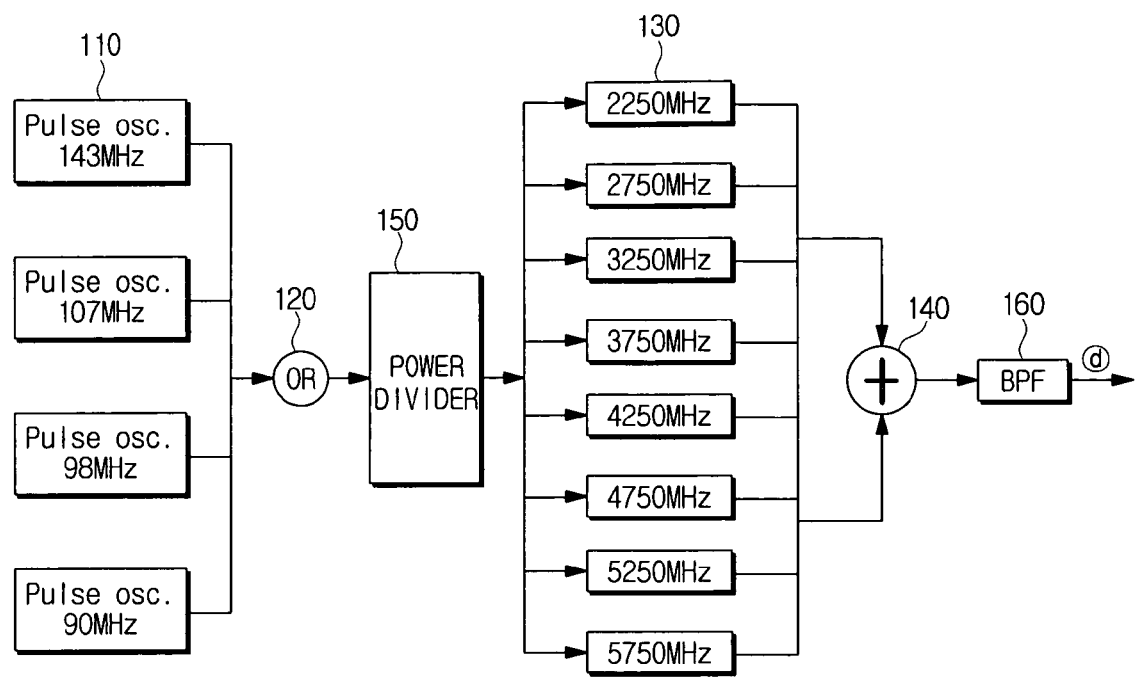
FIG. 5 is a block diagram of a chaotic signal generator according to another exemplary embodiment of the present invention.
Figure 6A:
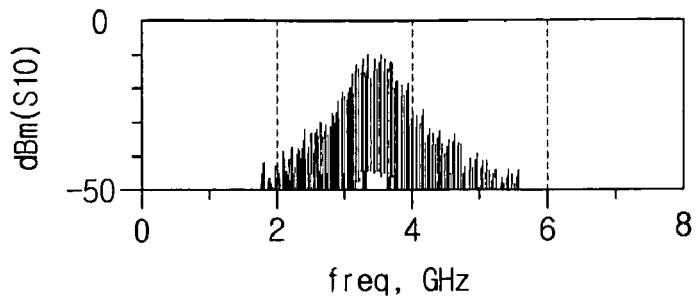
FIGS. 6A through 6D are waveform diagrams of a chaotic signal which is output at the point (d) in the filtered band of the BPF.
Figure 6B:
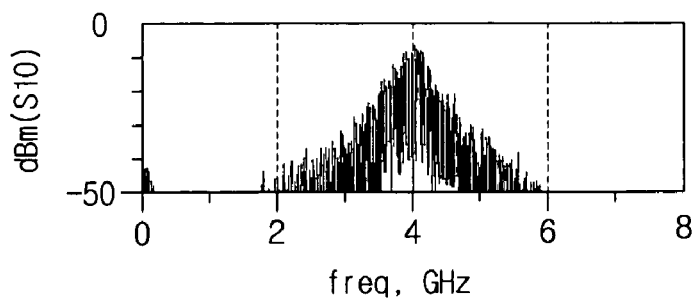
Figure 6C:
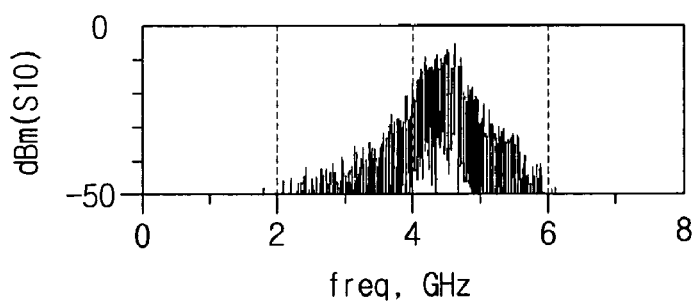
Figure 6D:
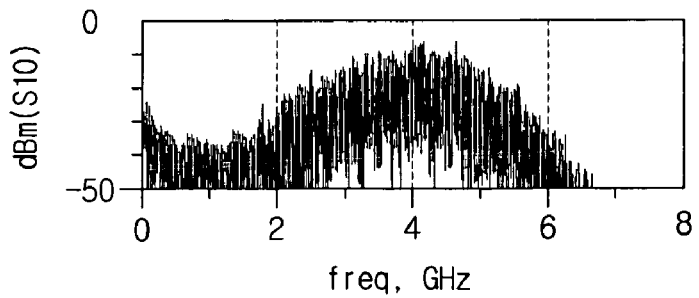

FIG. 5 is a block diagram of a chaotic signal generator according to another exemplary embodiment of the present invention.

The chaotic signal generator in another exemplary embodiment includes a plurality of pulse generators 110, a plurality of local oscillators 130, a power combiner 140, and a BPF 160.

While the plurality of OR gates 20 is employed in accordance with the number of the local oscillators 30 in one exemplary embodiment, a single OR gate 120 is employed in another exemplary embodiment. This is because the same pulse signals are output from the OR gates. In another exemplary embodiment, a power divider 150 is used to provide the pulse signal output from the OR gate 120 to the local oscillators 130.

As such, the chaotic signal generator generates the chaotic signals from the multiple channels using the plurality of the local oscillators 30 or 130, and produces the UWB chaotic by combining the chaotic signals. Thus, it is possible to output only the frequency band of the desired channel using the filter.

Interference between users does not occur because multiple channels are formed and the users use the different channels. Therefore, the plurality of users can carry out the radio communications within a specific wireless communication range.

The chaotic signal generator can achieve the simplified structure, the low power consumption, and the small size. Furthermore, the manufacture of the chaotic signal generator is facilitated with devices integratable on the IC.

As set forth above, the plurality of users can conduct radio communications in a specific wireless communication range at the same time by generating the chaotic signal that can be split to the multiple channels.

The foregoing exemplary embodiments are merely exemplary and are not to be construed as limiting the present invention. The present teaching can be readily applied to other types of apparatuses. Also, the description of the exemplary embodiments of the present invention is intended to be illustrative only, and not to limit the scope of the claims, as many alternatives, modifications, and variations will be apparent to those skilled in the art. Therefore, the scope of the present invention should be defined by the appended claims and their equivalents.

What is claimed is:

1. A chaotic signal generator for ultra wideband (UWB) communications, comprising:
   a plurality of pulse generators which generates pulses of different frequencies;
   at least one combiner which combines the pulses generated at the plurality of pulse generators; and
   a plurality of local oscillators which receives signals output from the at least one combiner, and generates chaotic signals by increasing frequencies of the received signals to different frequency bands.

2. The chaotic signal generator as in claim 1, wherein the frequencies of the pulses generated at the plurality of pulse generators are determined such that the pulses from the plurality of pulse generators are arranged at random after passing through the at least one combiner.

3. The chaotic signal generator as in claim 1, wherein the at least one combiner comprises an OR gate.

4. The chaotic signal generator as in claim 1, wherein the at least one combiner comprises a plurality of combiners which are provided for each of the local oscillators.

5. The chaotic signal generator as in claim 1, further comprising:
   a power divider which divides the signals output by the at least one combiner for input into the local oscillators,
   wherein the at least one combiner comprises only one combiner.

6. The chaotic signal generator as in claim 1, wherein a number of the plurality of local oscillators is determined according to a frequency bandwidth of the chaotic signals output from the plurality of local oscillators.

7. The chaotic signal generator as in claim 1, wherein a number of the plurality of local oscillators is determined according to a frequency bandwidth of each of channels.

8. The chaotic signal generator as in claim 1, wherein a number of the plurality of local oscillators is determined according to a number of channels.

9. The chaotic signal generator as in claim 1, wherein the plurality of local oscillators comprises a voltage controlled oscillator (VCO).

10. The chaotic signal generator as in claim 1, further comprising:
    a power combiner which generates an UWB chaotic signal by combining the chaotic signals generated at the plurality of local oscillators.

11. The chaotic signal generator as in claim 10, further comprising:
    a filter which filters and only outputs a chaotic signal of a preset frequency band from the UWB chaotic signal output from the power combiner.

12. The chaotic signal generator as in claim 11, wherein the filter is a tunable band pass filter (BPF) which changes a filtered frequency band.

13. A chaotic signal generator for ultra wideband (UWB) communications, comprising:
   a plurality of pulse generators which generates pulses having different frequencies;
   at last one combiner which combines the pulses generated at the plurality of pulse generators;
   a plurality of local oscillators which receives signals output from the at least one combiner and increases frequencies of the received signals to different frequency bands;
   a power combiner which generates an UWB chaotic signal by combining signals generated at the plurality of local oscillators; and
   a filter which filters and only outputs a chaotic signal of a preset frequency band from the UWB chaotic signal output from the power combiner.

14. A chaotic signal generating method for ultra wideband (UWB) communications, comprising:
   generating a plurality of pulses of different frequencies;
   combining the generated plurality of pulses to generate a combined signal;
   increasing frequencies of the combined signal to different frequency bands; and
   generating an UWB chaotic signal by combining signals increased to the different frequency bands.

15. The chaotic signal generating method as in claim 14, wherein the frequencies of the pulses are determined such that the plurality of pulses are randomly arranged in the combined signal.

16. The chaotic signal generating method as in claim 14, further comprising:
   dividing a power of the combined signal to plural powers.

17. The chaotic signal generating method as in claim 14, further comprising:
   filtering and outputting only a chaotic signal of a preset frequency band from the UWB chaotic signal.

* * * * *